Sept. 1, 1964   P. I. HOLLMAN   3,146,794
GAS VALVES

Filed Jan. 23, 1961   4 Sheets-Sheet 1

United States Patent Office 3,146,794
Patented Sept. 1, 1964

3,146,794
GAS VALVES
Peter I. Hollman, Willow Grove, Pa., assignor to Robertshaw Controls Company, a corporation of Delaware
Filed Jan. 23, 1961, Ser. No. 84,219
8 Claims. (Cl. 137—625.15)

This invention to gas valves such as are used for controlling fluid fuel flow from a source of supply to a double burner wherein one of the burners is called a main burner and the second burner is called a simmer burner. More particularly, this invention relates to gas valves having a single valve disc, which valve disc controls and regulates fluid fuel flow from the fuel supply inlet to the separate passageways of the main and simmer burners.

In prior applications of gas valves for controlling fluid flow to a double burner, difficulty has been experienced in regulating the output of the simmer burner variably through an initial predetermined range, after which a simultaneous regulation of the output of both the main burner and the simmer burner from a minimum output to a maximum output at a second higher predetermined range is accomplished. Double burners on a gas range have a relatively large main burner section and a smaller simmer burner section usually located substantially concentric within the periphery of the larger main burner section. Accordingly, when the main burner and the simmer burner are simultaneously in an operative condition, regulation of fuel flow through the gas valve must be such as to result in a substantially uniform heat distribution over the entire burner area.

For the most efficient operation of the two burners, it is desirable that the control valve have individual gas passageways leading to each of the main and simmer burner sections. To obtain the best utilization of heat output, the simmer burner section is to be used either separately or simultaneously with the main burner section. The gas supply to the simmer burner section must be easily regulated by the valve from a minimum rate of from 400 B.t.u. to 500 B.t.u. per hour to a maximum simmer rate of about 1200 B.t.u. per hour. When more heat output is required, the valve is operated beyond the point of the simmer flame setting to permit flow to the main burner section, the minimum rate to the main burner section being usually about 800 to 1200 B.t.u. per hour.

It is an object of this invention to improve the regulation of a gas valve of the disc type, which valve in a first condition controls a regulatable quantity of fuel to the simmer burner and, upon movement to a second condition, simultaneously controls regulatable quantities of fuel to the main and simmer burners.

A further object of this invention is to regulate fluid flow to a simmer burner through a valve disc formed with sized orifice passageways so as to permit a determinable minimum fluid flow therethrough.

Another object of this invention is to render a substantially constant linear increase in fuel flow through a gas valve of the disc type which operatively supplies a double burner.

Still another object of this invtntion is to construct a new and improved gas valve of the disc type which is simple, compact, and inexpensive to manufacture.

Briefly stated, in a preferred embodiment of this invention, the gas valve comprises a valve body, an inlet passage formed therein which is adapted to be connected to a fuel supply, said inlet passageway being terminated with a first port formed in the flat surface of a valve seat, which seat is formed integral with the valve body. A plurality of other ports are formed in the valve seat, which ports communicate by means of passageways formed in the valve body with one or the other of two outlet passageways. A disc valve member having an irregular shaped cavity and restricted passageways formed and ported on one side thereof as positioned in frictional engagement with the flat surface of the valve seat. Rotational movement of the valve member variously positions the cavity and restricted passageways of the valve member in communications with the port of the inlet passageways of the valve seat and the other ports formed in the valve body communicating with the other of two outlet passageways. The respective ports of the valve seat and the disc valve member cooperate in a manner such that variable regulated fuel flow passes to the two outlet passageways.

Other objects and advantages of this invention will be apparent from the following description taken in connection with the accompanying drawings wherein.

Figure 1:
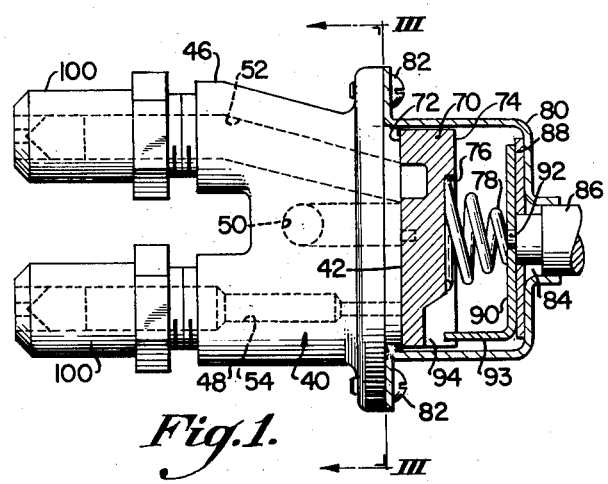
FIG. 1 is a top view, partly in section, of the gas valve.
Figure 2:
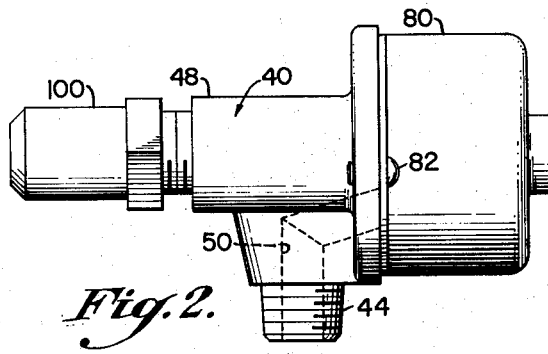
FIG. 2 is a side elevation view of the gas valve.
Figure 3:
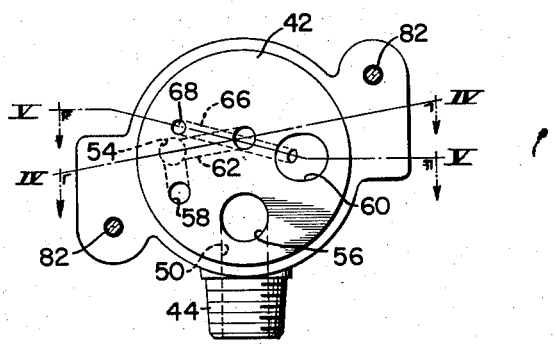
FIG. 3 is a cross sectional view of the gas valve shown in FIG. 1 taken along the line III—III showing the valve seat.

Referring now more particularly to FIGS. 1, 2, and 3, there is illustrated a valve body 40 formed with a flat ground circular valve seating surface or seat portion 42. An inlet nipple 44 and two outlet nipples 46 and 48 are formed integrally with the valve body 40. An inlet passageway 50 and a pair of outlet passageways 52 and 54 are formed in inlet nipple 44 and outlet nipples 46 and 48, respectively. Each of the passageways 50, 52, and 54 terminates in valve seat portion 42.

A fluid supply pipe (not shown) can be attached to inlet nipple 44 to supply fluids, such as natural gas, mixed gas, manufactured gas, or liquefied petroleum gases. An inlet port 56 of inlet passageway 50 is located off center of the center of seat portion 42. Outlet passageways 52 and 54 terminate in a pair of outlet ports 60 and 58, respectively, formed in seat portion 42. Each outlet port 58 and 60 is radially and circumferentially offset from the other and from the center of seat portion 42.

Figure 4:
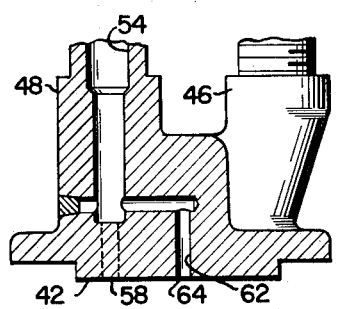
FIG. 4 is a cross sectional view taken along the line IV—IV of FIG. 3.

As best illustrated in FIGS. 3 and 4, an L-shaped bypass passageway 62 communicating with outlet passageway 54 terminates in a bypass port 64 formed in seat portion 42. Bypass port 64 is offset both radially and circumferentially from the center of seat portion 42.

Figure 5:
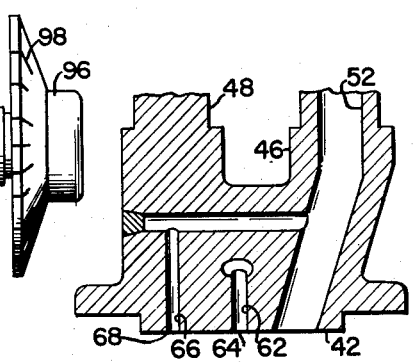
FIG. 5 is a cross sectional view taken along the line V—V of FIG. 3.

Similarly, as shown in FIGS. 3 and 5, an L-shaped bypass passageway 66 is formed in valve body 40 and communicates outlet passageway 52 with seat portion 42. A port 68, which is radially and circumferentially offset from the center of seat portion 42, forms the terminus of bypass passageway 66 therein.

As best shown in FIG. 1, a flat plate valve disc 70 is positioned in engagement with seat portion 42. A valve disc surface 72 of valve disc 70 is flat ground to slidably engage the surface of seat portion 42. The opposite side 74 of valve disc 70 has a recess 76 formed therein, which recess is of a suitable configuration so as to accommodate a conical helical compression retaining spring 78. A cup-shaped housing 80 is secured to valve body 40 by any suitable means, such as bolts 82, threadedly secured to valve body 40. Housing 80 has a centrally disposed aperture 84 located therein which has a diameter of a sufficient size to accommodate an actuator stem 86. A substantially flat washer 88 is disposed on actuator stem 86 and engages the peripheral portions of housing 80 disposed adjacent aperture 84. The diameter of the open end of housing 80 is of a dimension sufficient to accommodate valve disc 70.

An L-shaped operator 90 is secured to a projection 92 of actuator stem 86 by any suitable means, such as by crimping or soldering. A base leg 93 engages the sidewalls of a recess 94 which is spaced radially from the center of disc 70.

Retaining spring 78 is positioned intermediate recess 76 and operator 90 to bias valve disc 72 into engagement with seat portion 42. A suitable indicator knob 96, which has suitable indicia 98 scribed or otherwise marked thereon, is attached to the free end of actuator stem 86 for rotation thereof. Appropriate orifice caps 100 are threadedly attached to outlet nipples 46 and 48 and cooperate with fixed orifice pins (not shown) respectively located therein to provide adjustable orifice means through which the gas is supplied to the burners (not shown).

In operation, rotation of knob 96 will rotate valve disc surface 72 of valve disc 70 relative to ports 56, 58, 60, 64, and 68 formed in seat portion 42. Retaining spring 78 will urge valve disc surface 72 into engagement with seat portion 42 to obtain a frictional sliding engagement between the ground flat surfaces.

Figure 6:
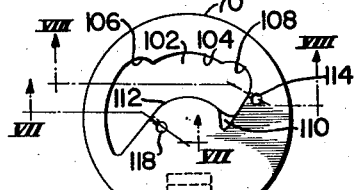
FIG. 6 is an end view of the valve disc.
Figure 7:
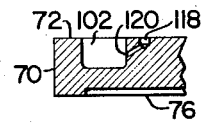
FIG. 7 is a partial cross sectional view taken along the line VII—VII of FIG. 6.
Figure 8:
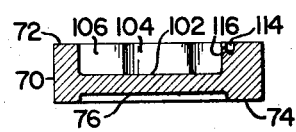
FIG. 8 is a cross sectional view taken along the line VIII—VIII of the valve disc shown in FIG. 6.

As shown in FIGS. 6, 7, and 8, valve disc surface 72 has an irregular, substantially crescent-shaped recess 102 formed therein. A plurality of boundary walls 104, 106, and 108 of recess 102 are formed substantially perpendicular to the plane of disc surface 72. The walls 104, 106, and 108 define three substantially distinct portions of the irregular shaped recess 102. Wall 104 defines an intermediate portion of recess 102 and is disposed from the center of disc 70 at a radius less than the radius from the center of the valve portion 42 to the innermost wall of port 58. Wall 106 defines a portion which is disposed from the center of disc 70 at a radius substantially equal to the radius from the center of valve portion 42 to the remote wall of port 56. Wall 108 describes a substantially circular arc which has a radius substantially equal to the radius of outlet port 60. An elongated tapered portion 110 is formed adjacent wall 108. The inner wall 112 is disposed from the center of disc 70 at a radius substantially equal to the distance from the center of valve portion 42 to the innermost wall of port 56.

An orifice 114 is formed in the surface 72 of disc 70 and is located intermediate wall 108 and tapered portion 110. A passageway 116 communicates orifice 114 with recess 102. In a similar manner, an orifice 118 is formed in valve surface 72 of disc 70 adjacent inner curved wall 112 of recess 102. A passageway 120 communicates orifice 118 with recess 102. Each of the passageways 116 and 120 is of a size to admit a sufficient amount of fluid to maintain a minimum size simmer flame at the simmer burner (not shown).

It will therefore be apparent that the gas valve of this invention will be in an operative condition to allow fuel flow to either of the burners (not shown) only when inlet port 56 is in communication with outlet ports 58, 60, 64, and 68. Fuel flow will occur when recess 102 is in communication with inlet 56 and either of the orifices 114, 118, or recess 102, or any combination thereof are in communication with any of the outlet ports 58, 60, 64, and 68.

FIGS. 16–23 illustrate one embodiment of the gas valve of this invention wherein the gas flow from the inlet port 56 to either or both of the outlet ports 58 and 60 is in a desired sequence pursuant to rotation of knob 96 from the "off" position to the "full on" position.

Figure 16:
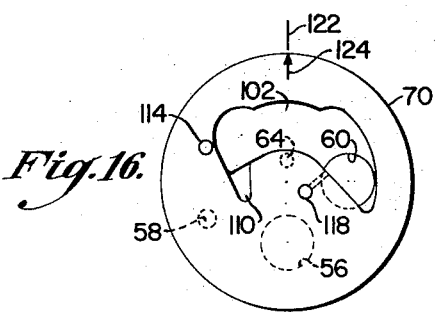
FIGS. 16–23 are views schematically representing the disc valve member of the first embodiment relative to the valve seat in a plurality of angular displacements.

In FIG. 16, the valve disc is positioned in the "off" position as indicated by indicium 122 and indicium 124. Valve disc 70 is positioned relative to seat portion 42 so that inlet 56 is not in communication with orifices 114 and 118 or any portion of recess 102 of valve disc 70.

Figure 17:
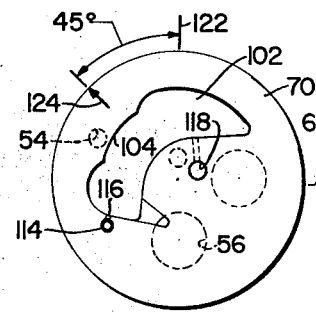

Rotation of the valve disc 70 through an angle of 45° positions it relative to inlet port 56 and outlet port 60 of seat portion 42, as indicated in FIG. 17. Tapered portion 110 of recess 102 has advanced over the edge of inlet port 56 to place the inlet port in communication with recess 102. Orifice 114 is now in registry with outlet port 58 in the valve portion 42. Fluid flow now takes place from inlet opening 56 into recess 102, through passageway 116, orifice 114, thence through outlet port 58 to outlet passage 54 to thereby supply fluid fuel to the simmer section of the burner. As previously stated, the passageway 116 is sized to admit the correct amount of fluid for a minimum size simmer flame.

Figure 18:
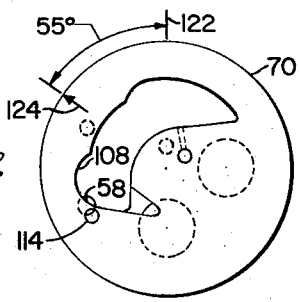

In FIG. 18, the disc valve 70 has been rotated an additional 10° to an opening of 55°, resulting in an increased opening between the inlet port 56 and recess 102. At this position, outlet port 58 is also partly uncovered to be directly in communication with inlet port 56. As the curvature of wall 108 of recess 102 is shaped to uncover a greater portion of outlet port 58, an increased flow of fluid will be supplied to outlet passageway 54 as the flow of fluid thereto is not restricted by passageway 116.

Figure 19:
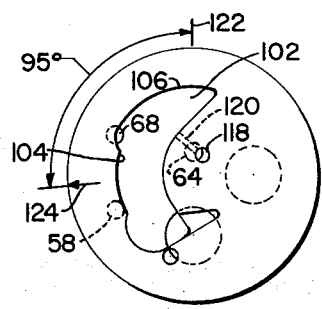

In FIG. 19, valve disc 70 has been rotated 95° so that the edge of wall 106 has now advanced to a position to expose a small portion of bypass port 68 to recess 102. Bypass outlet passageway 66 is therefore in communication with inlet port 56. Accordingly, after rotation through substantially 95°, fluid flow is from the inlet port 56 through the recess 102 to passageway 66 and outlet passageway 52, which passageway supplies the main burner.

As previously stated, it is important that when the flame of the main burner section is at a low rate, the simmer flame should also be at a minimum rate so as to obtain an essentially constant cross section flame over the entire burner. To obtain this highly desirable result, the bypass port 64 which communicates with the bypass outlet passageway 62 is placed in communication with the recess 102 by orifice 118 and passageway 120. As curved wall 104 is designed so as to not uncover outlet port 58, fuel flow to the simmer section is possible only by orifice 118 exposing bypass port 64. Passageway 120 is sized to admit the correct volume of fluid flow for a minimum size burner flame.

Figure 20:
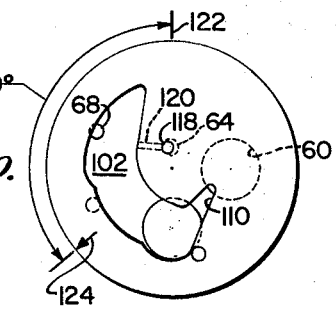

When valve disc 70 has been rotated through an angle of 130° as shown in FIG. 20, port 68 is fully opened to recess 102. Further, tapered portion 110 of recess 102 has partly uncovered the outlet port 60 of outlet passageway 52 to thereby supply the main burner with increased fuel flow from recess 102 by means of both bypass port 68 and outlet port 60. Orifice 118 is in registry with bypass port 64 so that the simmer burner is supplied with a minimum flow of fluid.

Figure 21:
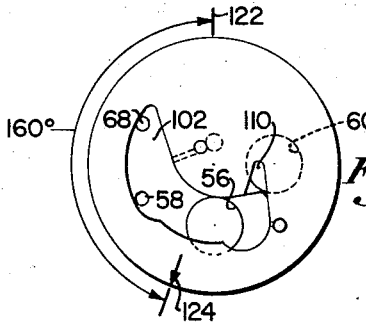
Figure 22:
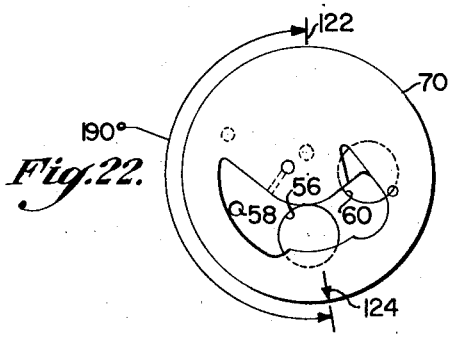

Further, it is to be noted that upon additional rotation of valve disc 70, the tapered portion 110 of recess 102 will increasingly expose a larger area of recess 102 to thereby increase fuel flow to outlet port 60. As best shown in FIG. 21, outlet port 60, by means of the tapered portion 110 of recess 102, is now in direct communication with the inlet port 56 so that the main burner is being supplied with an increased amount of fuel. Further, port 58 is now exposed to recess 102. The flame at the simmer burner is thereby increased as outlet port 58 and outlet passageway 54 are now in direct communication with inlet port 56. As shown in FIG. 22, rotation of valve disc 70 to the position of 190° will proportionately increase the volume of fuel flow to the main burner.

Figure 23:
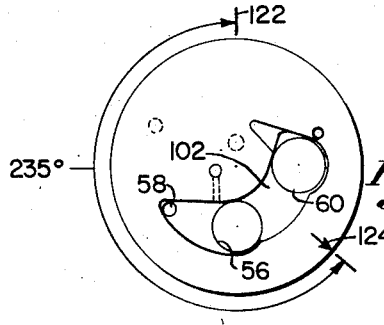

As shown in FIG. 23, outlet port 58 supplying the simmer burner and outlet port 60 supplying the main burner are fully exposed to the recess 102 of valve disc 70. At a rotation of substantially 235°, as indicated in FIG. 23, the main and simmer burners by means of ports 58 and 60 are in direct communication with inlet port 56 so that a maximum fuel flow is obtained at both the simmer and main burners.

In another embodiment of this invention, as shown in FIGS. 9–13, wherein like elements have been given the same reference numerals as in the first embodiment, the passageways in the valve body 40 and the valve disc 70 have been modified to obtain a similar proportional fuel flow to the main and simmer burners.

Figure 9:
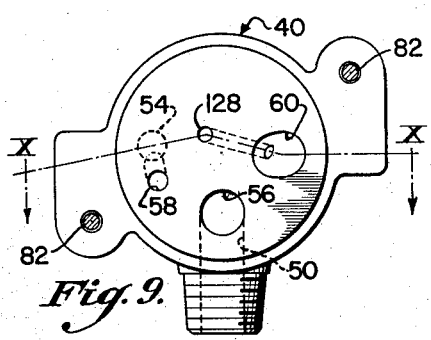
FIG. 9 is a view similar to FIG. 3 showing a second embodiment of the gas valve.
Figure 10:
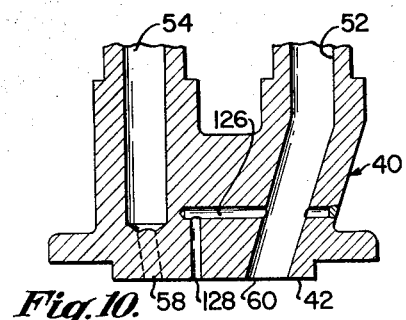
FIG. 10 is a cross sectional view taken along the line X—X of FIG. 9.

As best illustrated in FIGS. 9 and 10, inlet passageway 50 is formed in valve body 40 and has a terminus at the inlet port 56 on seat portion 42. Outlet passageway 52, which has outlet port 60 as a terminus in seat portion 42, is in communication with the main burner (not shown). An L-shaped passageway 126, which is formed in valve body 40, has a port 128 as a terminus in seat portion 42 and communicates outlet passageway 52 with seat portion 42.

Figure 11:
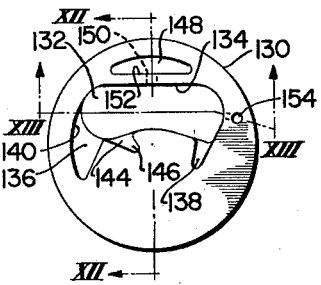
FIG. 11 is a view similar to FIG. 6 showing the valve disc of the second embodiment.
Figures 12, 13:
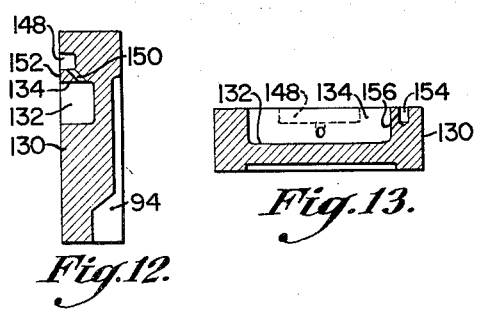
FIG. 12 is a cross sectional view taken along the line XII—XII of FIG. 11.
FIG. 13 is a cross sectional view taken along the line XIII—XIII of FIG. 11.

A cooperating valve disc 130, shown in FIGS. 11–13, can be positioned in sliding engagement with seat portion 42 of valve body 40 in a manner similar to that shown in FIG. 1. Valve disc 130 is formed with an elongated irregular shaped recess 132 which has one substantially flat surface wall 134 formed therein. At each of the remote ends of recess 132 there are located tapered portions 136 and 138. Tapered portion 136 has an outer curved wall 140, which wall has its center of curvature displaced from the center of valve disc 130 in a manner such that the arc described by wall 140 has a radius which increases from a point adjacent to wall 134 to the apex 142 of tapered portion 136. The offset radial displacement of the arc described by wall 140 from flat wall 134 to tapered portion 136 is substantially equal to the diameter of port 58 located in seat portion 42 of the valve body 40.

Tapered portion 138 is displaced at a radius from the center of disc 130 a sufficient distance to place tapered portion 138 in communication with inlet port 56 and outlet port 60 upon rotation of valve disc 130. A third tapered portion 144 is in communication with recess 132 and positioned adjacent to tapered portion 136. Tapered portion 144 extends substantially inwardly toward the center of valve disc 130 a sufficient distance such that the apex 146 will uncover port 128 upon the proper rotation of valve disc 130.

A crescent-shaped cavity 148 is located in valve disc 130 adjacent to and outwardly of flat wall 134 of recess 132. A sized passageway 150 extends through the wall 152 formed between cavity 148 and recess 132 to communicate recess 132 with cavity 148. The outer wall of cavity 148 is displaced from the center of valve disc 130 a distance substantially equal to the distance that outlet port 58 is displaced from the center of seat portion 42.

A recess 154 is located in valve disc 130 adjacent to tapered portion 138 and substantially at one remote end of recess 132. Recess 154 is in communication with recess 132 by a passageway 156. Recess 154 is displaced from the center of disc 130 substantially at a radius equal to the radius that outlet port 58 is displaced from the center of seat portion 42. Passageways 150 and 156 are of a size to permit a determinable volume of fuel flow to pass therethrough.

FIGS. 24–31 illustrate how the modified valve permits fuel to flow to both the simmer section and the main burner section in a desired sequence from the "off" position to the "full on" position.

Figure 24:
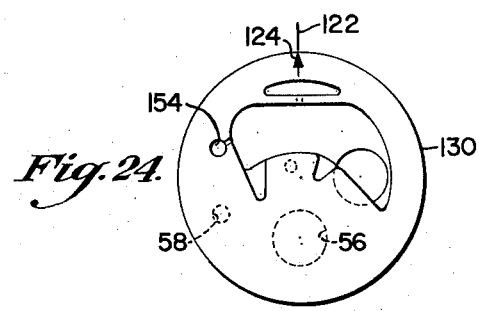
FIGS. 24–31 are similar to the views of FIGS. 16–23 except that these views incorporate the second embodiment of the invention.

FIG. 24 shows the valve disc 130 in position relative to the seat portion 42 of the gas valve wherein valve disc 130 fully covers inlet port 56. As in the previous embodiment, the cooperating indicium 122 and indicium 124 indicate the respective rotational positions of the valve disc 130.

Figure 25:
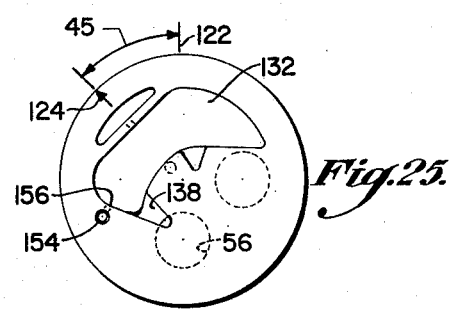

As shown in FIG. 25, the valve disc 130 has been rotated 45° so that tapered portion 138 of recess 132 uncovers a small area of inlet port 56. At the same time, recess 154 is moved into position directly in registry with outlet port 58 so that gas flow is obtained from the inlet passage 50 through inlet port 56, recess 154, passageway 156 to outlet port 58 and outlet passageway 54 to thereby supply fuel to the simmer section of a burner.

Figure 26:
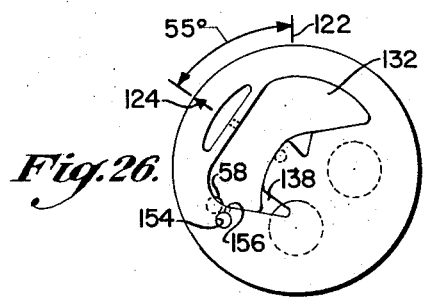

In FIG. 26, the valve disc 130 has been rotated an additional 10° to 55° whereby tapered portion 138 uncovers a larger area of inlet port 56. In addition, a portion of recess 132 has uncovered a portion of port 58, which port is no longer in communication with recess 154 so that gas flow does not take place through passageway 156. In this position, the gas valve permits a greater volume of fluid flow resulting in an increased simmer flame.

Figure 27:
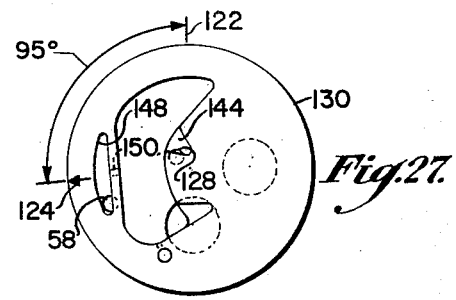

As illustrated in FIG. 27, valve disc 130 has been rotated to a 95° position, in which position cavity 148 uncovers a portion of outlet port 58. Fuel flow to the simmer burner is through inlet port 56, recess 132, passageway 150, cavity 148, outlet port 58 to outlet passage 54. In addition, tapered portion 144 of valve disc 130 has now partially uncovered port 128 which leads into passageway 126 and thence to the main burner section. Accordingly, at approximately 95°, as indicated in FIG. 27, fluid flow occurs in a manner such that both the simmer burner and main burner are supplied with minimum fuel flow.

Figure 28:
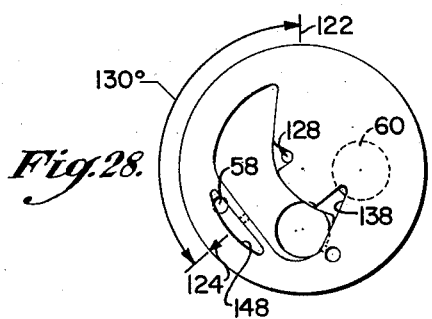

Further rotation to a position of 130°, as indicated by indicia 122 and 124, positions valve disc 130 relative to seat portion 42, as shown in FIG. 28. Outlet port 58 is still uncovered by cavity 148 and the gas flow that takes place through passageway 54 is a controlled gas flow determined by passageway 150. Further, tapered portion 144 has now fully uncovered port 128 so that the maximum flow through passageway 126 to the main burner is obtained. In addition, tapered portion 138 has partially uncovered port 60, which port directly supplies fuel to passageway 52 and thence to the main burner.

Figure 29:
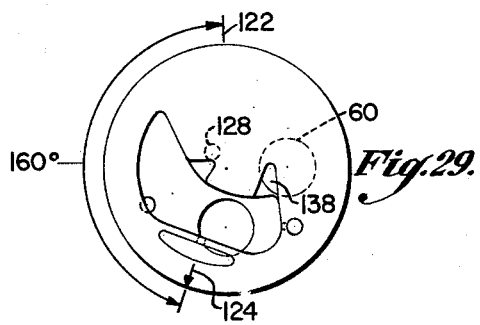

In FIG. 29, valve disc 130 has been rotated to a 160° position, at which position port 128 is now fully covered. Tapered portion 138 has now uncovered a greater portion of port 60 so that increased gas flow takes place from inlet port 56 to outlet passageway 52. Further, it is to be noticed that curved wall 140 has now uncovered port 58 so that the simmer section of the burner is in direct communication with the inlet supply.

Figure 30:
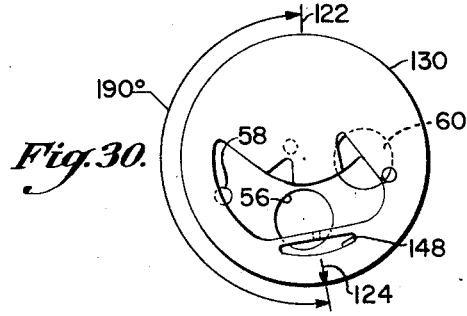

In FIG. 30, valve disc 130 has been rotated to a 190° position, at which position a greater area of outlet port 58 is uncovered. At this position, the volume of fuel supplied to both the simmer and burner sections will produce a medium flame height at both the simmer burner and the main burner.

Figure 31:
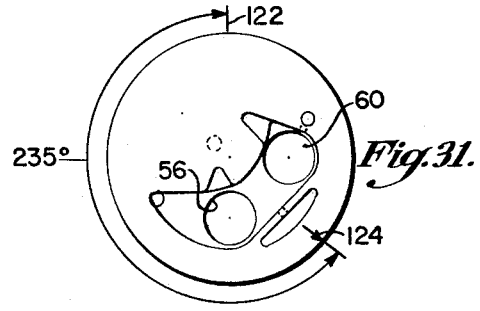

At the full on position, as is illustrated in FIG. 31, valve disc 130 has been rotated to 235°, wherein recess 132 has completely uncovered inlet port 56. Further, recess 132 has also fully uncovered outlet port 58 to the simmer burner and outlet port 60 supplying the main burner so that maximum fuel flow is obtained at this position.

Figure 14:
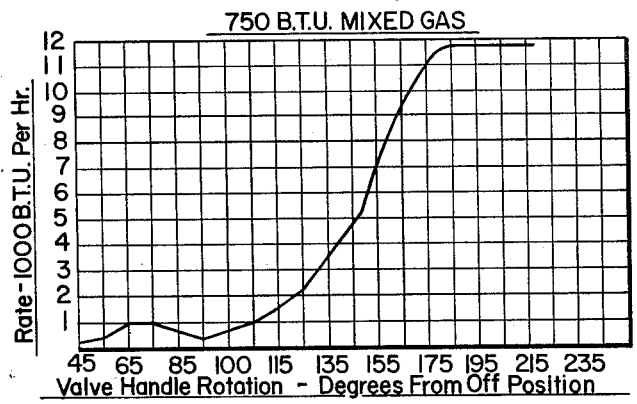
FIG. 14 is a flow diagram indicating approximately the gas flow at the various angular positions of either embodiment of the disc valve member using 750 B.t.u. mixed gas.
Figure 15:
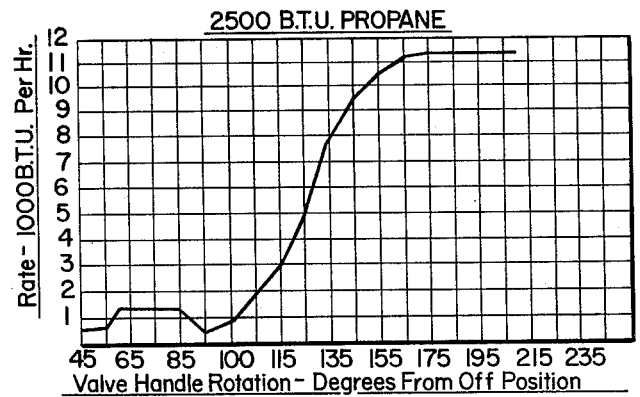
FIG. 15 is a flow diagram indicating approximately the gas flow at the various angular positions of either embodiments of the gas valve using 2500 B.t.u. propane gas.

In FIGS. 14 and 15, flow diagrams are shown in which the observed B.t.u. output is plotted against the rotational position of valve discs 70 and 130. Generally, most cooking operations in a gas range are performed between burner output rate of about 400 B.t.u. an hour to a burner output rate of about 5000 B.t.u. per hour. It is to be noted from an examination of the diagram that the valve in the 35° to 95° rotation range has two points at which the burner output rate approaches 500 B.t.u. per hour. Taking these diagrams in conjunction with the rotated positions of the valve discs 70 or 130, it will be obvious that the two positions at which the burner output rate is 500 B.t.u. per hour correspond to the positions wherein either the simmer burner alone has a minimum size flame or the simmer flame has again been reduced to minimum size and fluid is just beginning to flow to the main burner.

When the valve disc in either embodiment is rotated above the 95° position, it will be apparent from examination of FIGS. 14 and 15 that good valve regulation is obtained in this range, which valve regulation is directly proportional to the rotation of the indicator knob 96. Comparing the plots on FIG. 14 with those on FIG. 15, it will readily be seen that with the 500 B.t.u. output rate of the burner, a rotation of approximately 62° is required using mixed gas; whereas, approximately 40° is required in using propane gas. It will readily be appreciated that the gas valve disclosed herein will obtain a substantially linear output pursuant to the valve rotation, which linear output encompasses a greater degree of rotation of the valve member so that a more complete regulation of the fuel output can be obtained.

Inasmuch as various changes can be made in the details and the construction herein disclosed, it is intended that the foregoing description and drawings are illustrative and not in a limiting sense.

I claim:

1. In a gas valve for a double burner comprising a main burner and a simmer burner, the combination of a valve body having a valve seat surface on one end thereof and the other end thereof being provided with three openings therein, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, a valve disc having one surface thereof provided to slidably engage said valve seat surface, said valve disc having a recess provided therein and extending inwardly from said surface thereof, said valve disc having two separate and distinct cavities provided therein and extending inwardly from said surface thereof, said valve disc being provided with two passageways respectively interconnecting each of said cavities with said recess, means for rotating said valve disc, and means for successively registering the said recess and said cavities in said valve disc with said ports and said outlet in said valve seat surface to form a plurality of connecting flow passages within said valve disc and valve body.

2. In a gas valve for a double burner comprising a main burner and a simmer burner, the combination of a valve body having a valve seat surface at one end thereof and the other end thereof having three openings provided therein, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, said by-pass passageway being restricted to a size permitting a predetermined flow of fuel at normal operating pressure, a valve disc having one surface thereof provided to slidably engage said valve seat surface, said valve disc having a recess provided therein and extending inwardly from said surface thereof, said valve disc also having two separate and distinct cavities provided therein and extending inwardly from said surface thereof, said valve disc being provided with two passageways respectively interconnecting each of said cavities with said recess, said passageways being restricted to a size permitting a predetermined flow of fuel at normal operating pressures, means for rotating said valve disc and means for successively registering the said recess and said cavities in said valve disc with said ports and said outlet in said valve seat surface to form a plurality of connecting flow passages within said valve disc and said valve body.

3. In a gas valve for a double burner comprising a main burner and a simmer burner, the combination of a valve body having a valve seat surface at one end thereof and the other end thereof having three openings provided therein, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, said by-pass passageway being restricted to a size permitting a predetermined flow of fuel at normal operating pressure, a valve disc having one surface thereof provided to slidably engage said valve seat surface, said valve disc having recess means provided therein and extending inwardly from said surface thereof for successively registering said ports and said outlet in said valve seat surface, said valve disc also having two separate and distinct cavities provided therein and extending inwardly from said surface thereof, each of said cavities being disposed outwardly along said surface of said valve disc from the center thereof a distance equal to the outward disposition of one of said ports in said valve seat surface whereby said cavities are adapted to successively register with said one port, said valve disc being provided with two passageways respectively interconnecting each of said cavities with said recess means, said passageways being restricted to a size permitting a predetermined flow of fuel at normal operating pressures, and means for rotating said valve disc whereby said recess means and said cavities in said valve disc form a plurality of connecting flow passageways with said valve disc and valve body.

4. In a gas valve for a double burner comprising a main burner and a simmer burner, the combination of a valve body having a valve seat surface at one end thereof and the other end thereof being provided with three openings, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, a valve disc having one surface thereof provided to slidably engage said valve seat surface, said valve disc having a recess provided therein and extending inwardly from said surface thereof, said recess being provided with three separate wall portions substantially perpendicular to the plane of said surface of said valve disc, each of said wall portions having radii respectively equal to the radii of the outer walls of one each of said ports in said valve seat surface, and each of said wall portions being disposed outwardly from the center axis of said valve disc surface respectively equidistant to the outward disposal of the outer wall of said port to which it corresponds respectively in radii, and each of said wall portions of said recess and said ports being disposed circumferentially equidistant about their respective valve disc surface and valve seat surface, so that in at least one position of said valve disc all three of said wall portions of said recess coincide with all three respective outer wall portions of said ports, said valve disc also having two separate and distinct cavities provided therein and extending inwardly from said surface thereof, said valve disc being provided with two passageways respectively interconnecting each of said cavities with said recess, means for rotating said valve disc, and means for successively registering the said recess and said cavities in said valve disc with said ports and said outlet in said valve seat surface to form a plurality of connecting flow passages within said valve disc and valve body.

5. In a gas valve for a double burner comprising a main burner and a simmer burner, the combination of a valve body having a valve seat surface on one end thereof and the other end thereof being provided with three openings therein, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, a valve disc having one surface thereof provided to slidably engage said valve seat surface, said valve disc having orifice means provided therein and extending inwardly from said valve seat surface, said orifice means comprising a recess and two separate and distinct cavities extending inwardly from said surface of said valve disc, said valve disc being provided with two passageways respectively interconnecting each of said cavities with said recess, means for rotating said valve disc, and means for successively registering the said recess and said cavities in said valve disc surface with said ports and said outlet in said valve seat surface, whereby minimum flow is permitted to pass from one of said main flow passageways through said orifice means to another of said main passageways in one position of said valve disc, and maximum flow is permitted to pass from said one main passageway to the other said main passageway through said orifice means at another position of said valve disc.

6. In a gas valve for a double burner comprising a main burner and a simmer burner, the combination of a valve body having a valve seat surface on one end thereof and the other end thereof being provided with three openings therein, said valve seat surface having three ports provided therein, said valve body having three main passageways respectively interconnecting said ports with said openings, said valve body having a separate by-pass passageway adjacent said valve seat surface, said valve seat surface having an outlet therein interconnected to one of said main passageways by said by-pass passageway, a valve disc having one surface thereof provided to slidably engage said valve seat surface, said valve disc having orifice means provided therein and extending inwardly from said valve seat surface, said orifice means comprising a recess and two separate and distinct cavities extending inwardly from said surface of said valve disc, said valve disc being provided with two passageways respectively interconnecting each of said cavities with said recess, means for rotating said valve disc, and means for successively registering the said recess and said cavities in said valve disc surface with said ports and said outlet in said valve seat surface, whereby minimum flow is permitted to pass from one of said main flow passageways through said orifice means to another of said main passageways in one position of said valve disc, maximum flow is permitted to pass from said one main passageway through said orifice means to the said other main passageway in a second position of said valve disc, minimum flow is permitted to pass from said main passageway through said orifice means to both main passageways at a third position of said valve disc, and maximum flow is permitted to pass from said main passageway through said orifice means to both main passageways at a fourth position of said valve disc.

7. In a gas valve for a double burner comprising a main burner and a simmer burner, the combination of a valve body having a valve seat surface at one end thereof and the other and thereof having three openings provided therein, said valve seat surface having three ports provided therein, said valve body having three main passageways respectively interconnecting said ports with said openings, said valve body having two separate by-pass passageways adjacent said valve seat surface, said valve seat surface having one outlet therein interconnected to one of said main passageways by one of said by-pass passageways and another outlet therein interconnected to the other of said main passageways by the other of said by-pass passageways, a valve disc having one surface thereof provided to slidably engage said valve seat surface, said valve disc having a recess provided therein and extending inwardly from said surface thereof, said valve disc also having two separate and distinct cavities provided therein and extending inwardly from said surface thereof, said valve disc being provided with two passageways respectively interconnecting each of said cavities with said recess, means for rotating said valve disc and means for successively registering the said recess and said cavities in said valve disc with said ports and said outlets in said valve seat surface to form a plurality of connecting flow passages within said valve disc and valve body.

8. In a gas valve for a double burner comprising a main burner and simmer burner, the combination of a valve body having a valve seat surface at one end thereof and the other end thereof having three openings provided therein, said valve seat surface having three ports provided therein, said valve body having three main passageways respectively interconnecting said ports with said openings, said valve body having two separate by-pass passageways adjacent said valve seat surface, said valve seat surface having two outlets provided therein, said outlets being respectively interconnected to two of said main passageways by said by-pass passageways, a valve disc having one surface thereof provided to slidably engage said valve seat surface, said valve disc having recess means provided therein and extending inwardly from said surface thereof for successively registering with said ports in said valve seat surface, said valve disc also having two separate and distinct cavities provided therein and extending inwardly from said surface thereof, one of said cavities being disposed outwardly along said surface of said valve disc from the center thereof a distance equal to the outward disposition of one said outlet of one said by-pass passageway in said valve seat surface, and the other of said cavities being disposed outwardly along said surface of said valve disc from the center thereof a distance equal to the outward disposition of the other said outlet of the other said by-pass passageway in said valve seat surface whereby each of said cavities are adapted to register respectively with one of said outlets of said by-pass passageways in at least one position of said valve disc, said valve disc being provided with two passageways respectively interconnecting each of said cavities with said recess means, said passageways being restricted to a size permitting a predetermined flow of fuel at normal operating pressure, and means for rotating said valve disc whereby said recess means and said cavities in said valve disc form a plurality of connecting flow passages within said valve disc and valve body.

References Cited in the file of this patent
UNITED STATES PATENTS
2,765,809    Lamar _____ Oct. 9, 1956